United States Patent [19]
Brown et al.

[11] Patent Number: 5,645,336
[45] Date of Patent: Jul. 8, 1997

[54] ILLUMINATED FLUID LEVEL INDICATOR

[75] Inventors: David E. Brown, Strongsville; Mark A. Colman, Brunswick Hills; Michael J. Kett, Parma Hts., all of Ohio

[73] Assignee: Clark-Reliance Corporation, Strongsville, Ohio

[21] Appl. No.: 654,842

[22] Filed: May 29, 1996

Related U.S. Application Data

[62] Division of Ser. No. 440,014, May 12, 1995, abandoned.
[51] Int. Cl.$^6$ .............................. G01D 11/28; G01F 23/38
[52] U.S. Cl. .............................. 362/26; 362/28; 362/31; 362/32; 362/101; 73/293; 73/DIG. 5
[58] Field of Search .................................. 362/31, 32, 26, 362/28, 253, 101, 396; 73/293, 323, 328, 330, 314, 319, DIG. 5

[56] References Cited

U.S. PATENT DOCUMENTS

| | | | |
|---|---|---|---|
| 1,040,127 | 10/1912 | Bonesteel | 73/DIG. 5 |
| 2,289,374 | 7/1942 | Martin | 73/293 |
| 2,533,490 | 12/1950 | McGrath et al. | 362/26 |
| 2,596,897 | 5/1952 | Haatvedt . | |
| 3,328,570 | 6/1967 | Balchunas . | |
| 3,964,312 | 6/1976 | Sebek . | |
| 4,194,397 | 3/1980 | Yasuda | 73/DIG. 5 |
| 4,234,907 | 11/1980 | Daniel . | |
| 4,287,427 | 9/1981 | Scifres . | |
| 4,392,184 | 7/1983 | Hearold et al. . | |
| 4,440,022 | 4/1984 | Masom . | |
| 4,483,193 | 11/1984 | Bonetti . | |
| 4,519,017 | 5/1985 | Daniel . | |
| 4,746,178 | 5/1988 | Canty . | |
| 4,845,596 | 7/1989 | Mouissie | 362/32 |
| 4,885,663 | 12/1989 | Parker . | |
| 4,907,132 | 3/1990 | Parker . | |
| 4,937,709 | 6/1990 | Yanagi et al. . | |
| 4,952,511 | 8/1990 | Radmer . | |
| 5,042,900 | 8/1991 | Parker . | |

OTHER PUBLICATIONS

"Lumitex: Creators of Woven Light", specification sheets, 1992, (6 pages).
Jerguson Illuminators and Accessories, Series GA, specification sheet of Jerguson Gage and Valve Company (2 pages).

*Primary Examiner*—Stephen F. Husar
*Assistant Examiner*—Sara Sachie Raab
*Attorney, Agent, or Firm*—Calfee Halter & Griswold LLP

[57] ABSTRACT

Lighting assemblies are provided for visual indicators which indicate the level of fluid in a container. One such assembly comprises a backlighting assembly for a visual fluid level indicator having front and rear transparent viewing windows for viewing the level of a fluid contained therein, comprising (i) a substantially flat fiber optic panel located proximate the rear transparent viewing window; (ii) an attachment mechanism for attaching the substantially flat fiber optic panel to the visual fluid indicator proximate the rear transparent viewing window; and (iii) an illumination source optically coupled to the substantially flat fiber optic panel. The illumination source is a gas filled light source operating at less than 25 volts A.C. which is enclosed in a waterproof and explosion-proof enclosure, and which is optically coupled to the fiber optic panel by a fiber optic light cable. The lighting assembly may also be used for directly illuminating a magnetic fluid level indicator which indicates the level of fluid in a container to which it is attached.

20 Claims, 6 Drawing Sheets

ILLUMINATED FLUID LEVEL INDICATOR

This is a divisional of application Ser. No. 08/440,014 filed on May 12, 1995, abandoned.

FIELD OF THE INVENTION

The present invention relates generally to illumination devices and more particularly to a waterproof and explosion-proof illuminator which is used to backlight a visual fluid indicator or to directly illuminate a magnetic fluid indicator.

BACKGROUND OF THE INVENTION

A variety of liquid or fluid level indicators are known for monitoring and displaying the level of a liquid or fluid in a container in applications where the fluid is not directly visible. One such device is a visual fluid indicator which comprises a flat glass fluid level gauge which provides an indication of the vertical level of fluid in a container. Typically, the flat glass fluid level gauge is mounted vertically alongside the container and is connected at both its top and bottom ends with the interior of the container. The level of fluid in the container, when occupying levels between the top and bottom of the fluid level gauge, may be viewed through the glass in the gauge.

Another type of fluid level indicator is a magnetic fluid indicator which employs a plurality of magnetically responsive indicator elements which move in response to movement of a magnetic float contained within a fluid container (see, e.g. U.S. Pat. Nos. 3,964,312 and 4,483,193). The magnet is typically disposed in a vessel, such as a pipe, which is vertically mounted to the outside of the container and which is connected to the interior of the container at its top and bottom ends. The vertical position of the floating magnet changes as the level of fluid in the container, and thus the pipe, changes. The magnetically responsive indicator elements positioned at the level of the magnet are actuated in response to this movement. The indicator elements are typically painted or coated on the side which is visible when actuated to provide a visual indication of the fluid level.

Illuminators for enhancing the visibility of such fluid level indicator devices are known, typically including an incandescent bulb for applying light to the device. For example, in the visual fluid indicator described above, illuminators are known which comprise an illumination source and a reflector which reflects light provided by the illumination source onto the back of the fluid level gauge. For example, Series GA illuminators manufactured by Jerguson®, which are designed to improve the readability of flat glass fluid level gauges in poorly lighted areas, include an incandescent light bulb and a large wedge-shaped reflector mounted behind the fluid level gauge. The output of the light source is spread by the wedge-shaped reflector and applied to the back of the gauge.

The above-described illuminator, however, suffers from several drawbacks. Installation typically requires the illuminator to be bolted to the gauge, and the bolts tightened to a specific torque value. If the illuminator is attached to the gauge using the same bolts that hold the gauge together, the torque applied to the gauge may be affected by the illuminator. Installation is also made difficult due to the size and weight of the incandescent bulb and the large wedge-shaped reflector.

In addition, the wedge-shaped reflector of the known illuminator does not evenly distribute light from the light source across the length of the wedge. This phenomenon is particularly noticeable if a string of wedge-shaped illuminators are connected end-to-end in a particular application to illuminate a longer gauge. In any particular reflector of the string, the brightest point of the illumination occurs at the point opposite the light source and the dimmest point occurs at the points furthest away from the light source. The human eye adjusts to these bright spots which greatly affects readability in the dimmer regions. Moreover, the wedge-shaped reflector tends to catch the wind in external environments which may apply unacceptable levels of stress to the vertical gauge to which it is attached. Still further, the bulky size of the wedge-shaped reflector poses a risk of being inadvertently dislodged from its mounting by service personnel.

In addition, the use of an incandescent bulbs in known illuminators requires recurrent maintenance. Because the fluid level gauges are used in environments where processing equipment such as pumps are operating, vibration may cause filament damage and eventual bulb failure. Vibration other than that caused by the processes being monitored, such as that caused by wind as described above, can also lead to bulb failure. Even absent such vibration, the incandescent bulbs are typically rated for only about a 2500 hour lifetime, in part because they operate at relatively high voltages. The environments in which these illuminators are installed are typically operated around the clock, and thus the bulbs must be replaced every 100 days or so. Because the illuminators are often installed in areas which are not easily accessed, recurrent maintenance of the illuminators is a problem.

Moreover, because level indicator illuminators are often used in wet environments where combustible gases are present, the potential for explosion must also be accommodated by the illuminator design. Wet environments increase the risk of illuminator failure. If the illuminator has become heated as a result of continuous operation, and the outer enclosure of the illuminator begins to get wet, the enclosure begins to cool, causing air contained therein to cool and contract. The resulting vacuum draws moisture which accumulates on the outer enclosure into the interior cavity of the enclosure. If any of this moisture comes into contact with the hot illumination source, the illumination source is likely to explode. Although an explosion-proof enclosure will likely contain the explosion, the exploding bulbs present a maintenance problem in that they must repeatedly be replaced, especially in wet illuminator environments.

It is therefore also desirable that illuminators for fluid level indicator devices be waterproof and explosion-proof. Standards, such as those established by the National Electrical Manufacturers Association (NEMA), have been promulgated by which devices such as illuminators may be rated in terms of being waterproof and explosion-proof.

Accordingly, it is an objective of the present invention to provide a waterproof and explosion-proof illuminator for a fluid level gauge which provides even illumination across the entire fluid level gauge, requires little maintenance, is lightweight and of manageable size to facilitate easy attachment and detachment from a fluid level gauge, and is suitable for both interior and exterior applications.

SUMMARY OF THE INVENTION

An illuminator for a fluid level indicator is provided. The illuminator enhances the visibility of the indicator when attached thereto. The illuminator may be attached to a variety of fluid level indicators, including both visual fluid level indicators and magnetic fluid level indicators.

When adapted for use with a visual fluid level indicator, the illuminator comprises a backlighting assembly which is attached to the back of the indicator. The backlighting assembly comprises (i) an enclosure containing an illumination source such as a halogen or other gas filled bulb, (ii) an illumination panel housing which contains an illumination panel such as a fiber optic panel, and (iii) spring clips which attach the illumination panel housing, and hence the entire backlighting assembly, to the visual fluid indicator. The enclosure includes a transformer for converting standard line power to a substantially lower voltage at which the illumination source operates. The enclosure is designed to meet NEMA 7 explosion-proof standards and NEMA 4 waterproof standards.

The illumination source is optically coupled to the illumination panel by means of a bundled fiber optic light cable. The illumination source shines downwardly toward the fiber optic light cable which transmits light to the illumination panel. The illumination panel provides an evenly illuminated surface which is used to backlight the visual fluid level indicator.

When adapted for use with a magnetic fluid level indicator, the illuminator comprises an illuminator/magnetic indicator assembly adapted to be used with a vertically extending vessel such as a pipe containing a floating magnet. The assembly includes an illumination panel housing which (like the first embodiment) contains the illumination panel. In addition to using the same illumination panel as the first embodiment, the same transformer, illumination source, and light cable are also used.

The illumination panel housing also includes an array of magnetic indicating elements which respond to movement of the magnet in the pipe to provide a visual indication of the level of fluid in the pipe. The illumination panel is positioned within the illumination panel housing generally perpendicular to the array of magnetic indicating elements to shine sufficient light onto the array of indicating elements to enhance their visibility. A hose clamp is used to attach the illumination panel housing, and thus the illuminator/magnetic indicator assembly, to the pipe.

DETAILED DESCRIPTION OF THE PREFERRED EMBODIMENT

The inventive illuminator has intended applications for a variety of fluid level indicators. When attached to a fluid level indicator, the illuminator enhances the visibility of the indicator, especially in environments where visibility would otherwise be poor. Two of the intended fluid level indicator applications for the illuminator are more fully described below.

Figure 1:
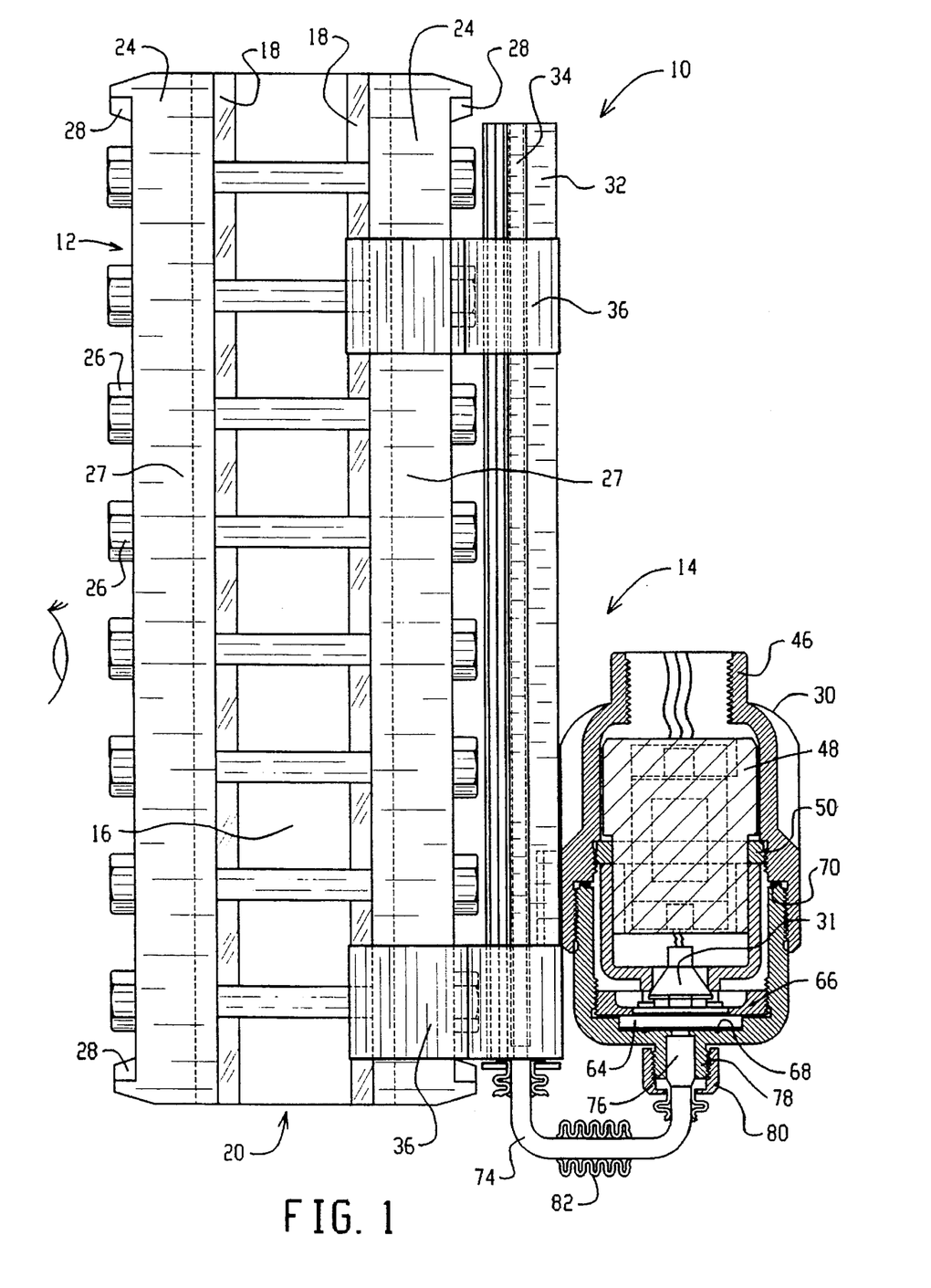
FIG. 1 shows a side view of a first embodiment of an illuminated fluid level indicator constructed according to the principles of the present invention.
Figure 2:
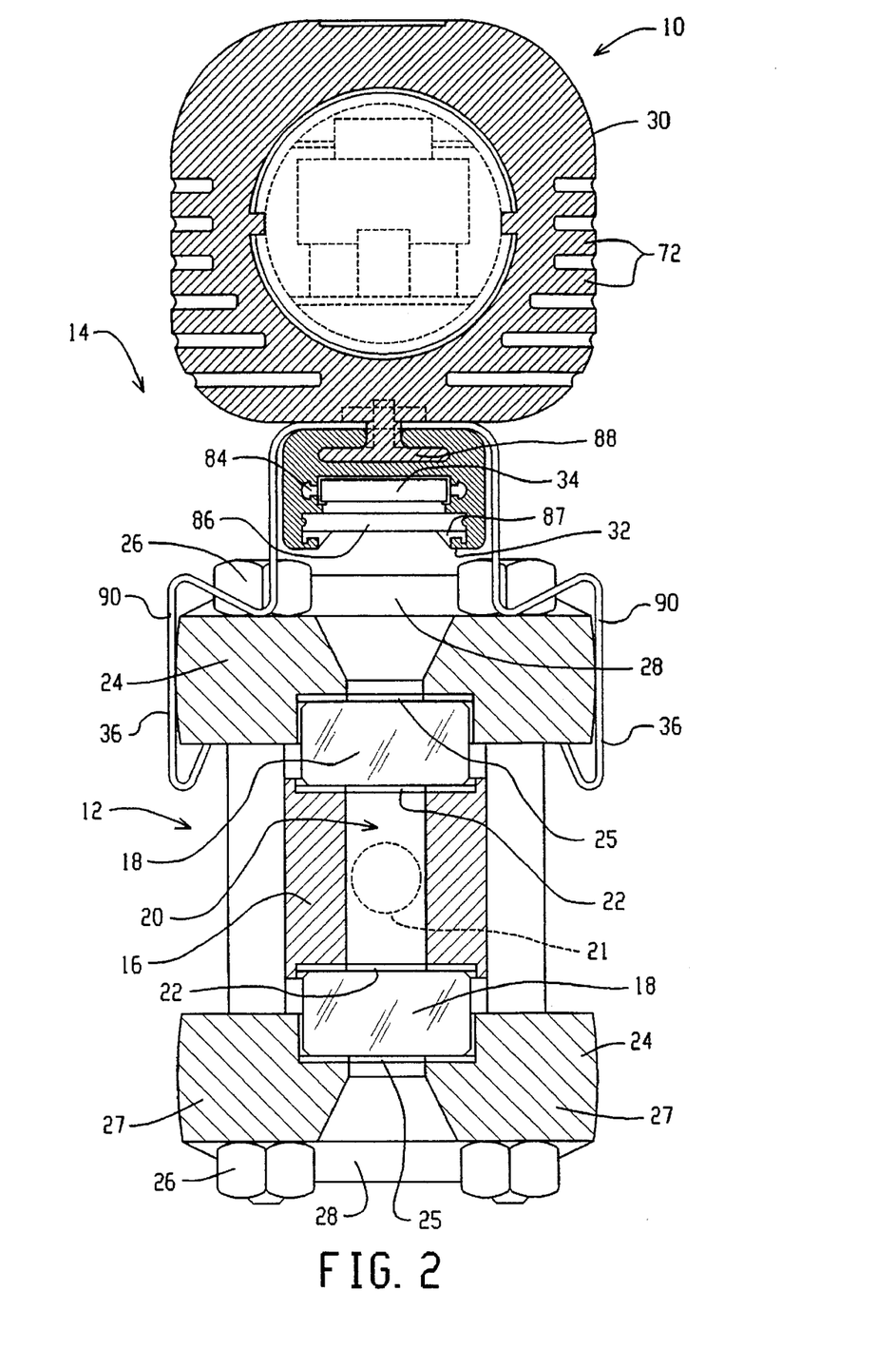
FIG. 2 shows a top view of the illuminated fluid level indicator of FIG. 1.

Referring first to FIGS. 1 and 2, a first embodiment of an illuminated fluid level indicator 10, constructed according to the principles of the present invention, is shown. FIG. 1 shows a side view of the illuminated indicator 10 while FIG. 2 shows a top view of the illuminated indicator. The illuminated indicator 10 comprises a standard visual fluid indicator 12 to which is attached a backlighting assembly 14.

The standard visual fluid indicator 12 may be connected directly to the wall of a vessel or tank, or connected in-line with a pipe or conduit, as is generally known in the art. The indicator 12 comprises a steel chamber 16 having viewing windows 18 in front and back. As used herein with respect to the first embodiment of the invention, "front" shall mean the surface of the indicator which is viewed when looking left to right in FIG. 1 or bottom to top in FIG. 2, and "back" shall mean the surface of the indicator to which is attached the backlighting assembly 14.

The chamber 16 and the windows 18 enclose a channel 20 which is milled into a metal bar. Holes 21 are drilled into each end of the bar stock through to the chamber 16. Each of the holes 21 is threaded so that a threaded pipe from a container may be fitted therein. The glass panels (transparent viewing windows) 18 (see FIG. 2) serve to close the chamber so that the only communication with the chamber is made through the threaded holes 21. Sealing gaskets 22 seal the glass/steel interface between the steel chamber 16 and the front and back viewing windows 18.

The structural integrity of the indicator 12 is insured by front and back covers 24, which are forged or formed from bar stock and connected to each other by a series of nuts and bolts 26. The nuts are drawn down on threaded ends of the bolts to couple the chamber 16 to the cover 24, and to compress sealing gaskets 22 at the glass/steel interface between the chamber and the front and back viewing windows 18. Cushioning gaskets 25 are provided at the interface of the glass panels 18 and the forged steel covers 24.

Each of the forged steel covers includes spaced longitudinal portions 27 which allow viewing of the windows therebetween. The spaced longitudinal portions 27 are connected at their top and bottom ends by reinforcing ribs 28 which are integrally forged with the spaced longitudinal portions.

The visual fluid indicator 12 as described above is a known item. The backlighting assembly 14 which is attached to the back of the indicator and the resulting illuminated indicator 10, however, form the basis of the first embodiment of the present invention. The backlighting assembly 14 comprises an enclosure 30 containing an illumination source 31, an illumination panel housing 32 which contains an illumination panel 34 and with which the enclosure 30 is slidably engageable, and upper and lower spring clips 36 which attach the illumination panel housing 32, and hence the entire backlighting assembly 14, to the visual fluid indicator 12.

Figure 3:
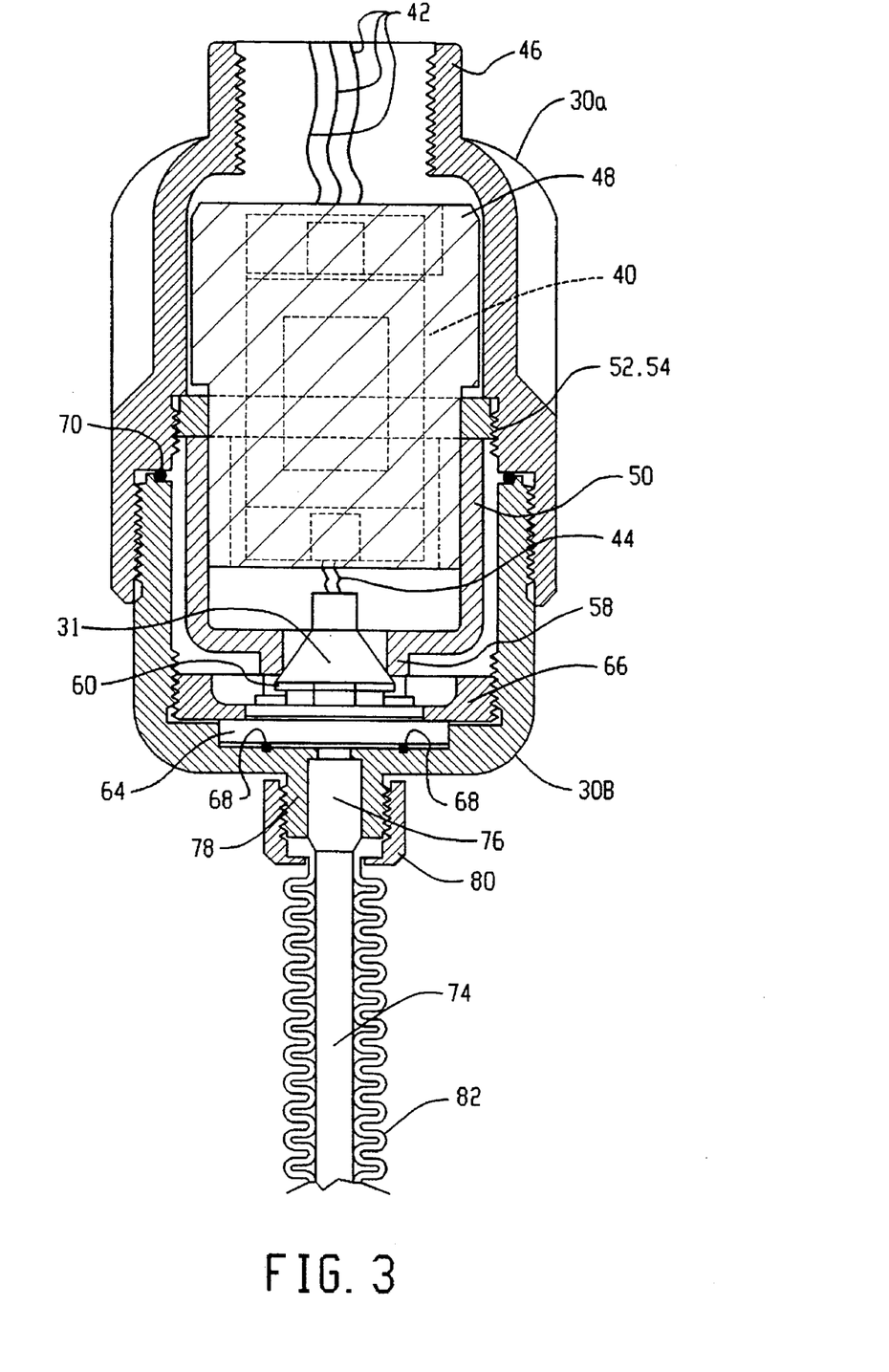
FIG. 3 shows a more detailed side view of the backlighting assembly of the illuminated fluid level indicator of FIG. 1.

FIG. 3 shows a more detailed view of the enclosure 30 of the backlighting assembly 14. The enclosure 30 includes upper and lower portions 30A and 30B respectively, which together enclose the illumination source 31 for the illumination panel 34 (see FIG. 2) and a transformer assembly 40 for providing power to the illumination source 31. The transformer assembly 40 converts 120 VAC or 240 VAC power provided on input lines 42 to a low voltage AC power of less than 25 VAC on output lines 44. The input lines 42 are routed to the transformer assembly 40 through a threaded conduit coupling 46 in the upper portion 30A of the enclosure.

In the preferred embodiment, the transformer assembly converts either type of input (120 or 240 VAC) into a low power output on the order of 5 VAC. The preferred illumination source is a non-incandescent light source, such as a gas filled (e.g. halogen) light source. One such light source is a gas filled bulb which operates on approximately 5 VAC, provided by Lumitex, Inc. of North Royalton, Ohio. Such a bulb has an expected lifetime of about 15,000 to 17,000 hours, depending on operating voltage.

The transformer assembly 40 is potted in a non-conductive material to form a potted transformer assembly 48 molded into a shape which corresponds generally to the interior surface of the upper portion 30A of the enclosure. Potting the transformer also eliminates dead air space in the enclosure which reduces the risk of explosion by reducing the volume in which combustible gases may form. Once seated within the top portion 30A, the potted transformer assembly 48 is secured within the upper portion 30A of the enclosure by means of a transformer retainer 50 (see FIG. 4). The retainer 50 is provided with a threaded portion 52 which screws into corresponding threads 54 in the upper portion 30A.

Figure 4:
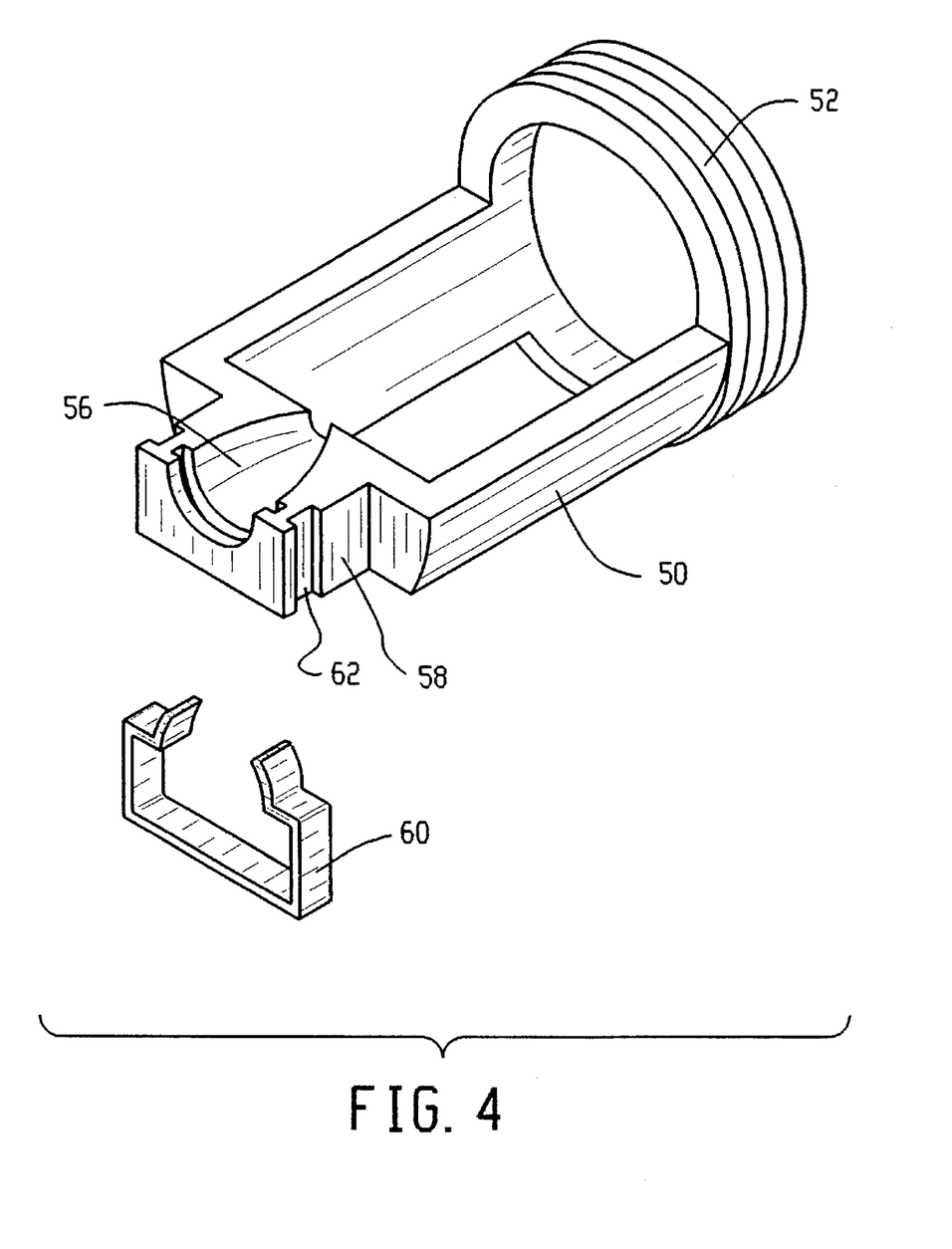
FIG. 4 shows a perspective view of the retainer used in the backlighting assembly of FIG. 3.

The output wires from the potted transformer assembly 48 connect to the illumination source 31 which resides in a recess 56 in an extension 58 of the retainer 50. A clip 60 snaps over a groove 62 in the extension 58 to secure the illumination source 31 to the retainer 50.

The lower portion 30B of the enclosure 30 includes a transparent (glass) protective panel 64 for the illumination source 31. The panel 64 seats within a recess in the inner surface of the lower portion 30B and is secured in place by a threaded panel retainer 66 which screws into an internal surface of lower portion 30B of the enclosure. An O-ring seal 68 seals the interface between the transparent panel 64 and the lower portion 30B of the enclosure.

After the transparent panel 64 is secured to the internal surface of lower portion 30B of the enclosure, the lower portion 30B may be screwed into the upper portion 30A of the enclosure to complete the assembly of the enclosure 30. An O-ring seal 70 is provided at the upper portion—lower portion interface to seal the enclosure 30. The upper and lower portions of the enclosure 30 are constructed from cast aluminum. Heat generated by the transformer assembly 40 and the illumination source 31 is dissipated from the cast aluminum enclosure to the outside environment by means of heat-radiating fins 72 on the upper portion 30A of the enclosure (see FIG. 2).

The assembled enclosure 30 is designed to meet NEMA 7 explosion-proof standards and NEMA 4 waterproof standards. To meet the NEMA 7 explosion-proof standard to contain any explosion which may occur within the enclosure, all joints ("flame paths") connecting the interior of the enclosure the outside must safely extinguish all flames and hot gases which might otherwise be expelled in an explosion. In the enclosure 30 of FIG. 3, the two critical flame paths are the interface between the lower portion 30B of the enclosure and the transparent panel 64, and the interface between the upper and lower portions 30A, 30B of the enclosure. O-rings 68 and 70 are positioned to provide watertight seals at these interfaces, respectively.

As shown in FIGS. 1 and 3, the illumination source 31 is optically coupled to the illumination panel 34 by means of a bundled fiber optic light cable 74. The light cable is connected at one end to the illumination panel 34 and at the other end to a ferrule 76. The ferrule serves as the interface between the illumination source 31 and the optical fiber ends of the light cable 74. The individual fiber ends are aligned and polished to form a smooth planar surface which is perpendicular to the optical axis of the illumination source 31.

The ferrule is positioned in front of the illumination source 31 by being inserted into an extension 78 in the lower portion 30B of the enclosure. A threaded cap 80 is screwed onto threads on the extension 78 to secure the ferrule in this position. Such an arrangement permits the illumination source 31 to shine downwardly toward the fiber optic light cable. A flexible protective sheath 82 covers the fiber optic light cable and is secured at one end to the cap 80 and at the other end to the illumination panel 34.

The illumination panel 34 is substantially flat and located proximate the rear transparent viewing window of the visual fluid indicator 12, within a channel 84 which extends the length of the illumination panel housing 32 (see FIG. 2). "Flat", as used herein, is meant to describe a relatively broad surface in relation to its thickness or depth. A protective transparent plate 86 is provided within the illumination panel housing to protect the flat illumination panel 34 from the outside environment. A gasket 87 seals the edges of the plate 86.

In one embodiment of the invention, the substantially flat illumination panel 34 is comprised of a plurality of fiber optic fibers. The illumination device in the preferred embodiment of the present invention is a fiber optic light emitting panel such as that disclosed in U.S. Pat. No. 4,885,663 to Parker and assigned to Lumitex, Inc. from which assignee the light emitting panel is commercially available. The panel includes an emitter surface having one or more layers of woven fiber optic fibers. Bends along the length of fibers permit light to be emitted from the emitter surface. Light is transmitted to the emitter surface from the illumination source 31 through light cable 74.

The enclosure 30 is attached to the illumination panel housing 32 containing the illumination panel 34 by means of a T-bar extension 88 which slidably engages a corresponding slot in the illumination panel housing (see FIG. 2). The resulting illumination panel housing and enclosure combination may then be attached to the visual fluid indicator 12 by means of the spring clips 36, which are fixedly attached to the illumination panel housing by appropriate means.

The spring clips permit the backlighting assembly 14 to be easily and removably attachable to the visual fluid indicator 12. Each of the spring clips 36 includes a pair of extending arms 90 which extend from the illumination panel housing and are designed to resiliently deflect during coupling of the backlighting assembly to the visual fluid indicator, (ii) engage an outer surface of the rear cover 24 of the visual fluid indicator with a predetermined amount of resistance when the backlighting assembly is attached to the visual fluid indicator, and (iii) resiliently deflect during uncoupling of the backlighting assembly the visual fluid indicator.

Figure 5:
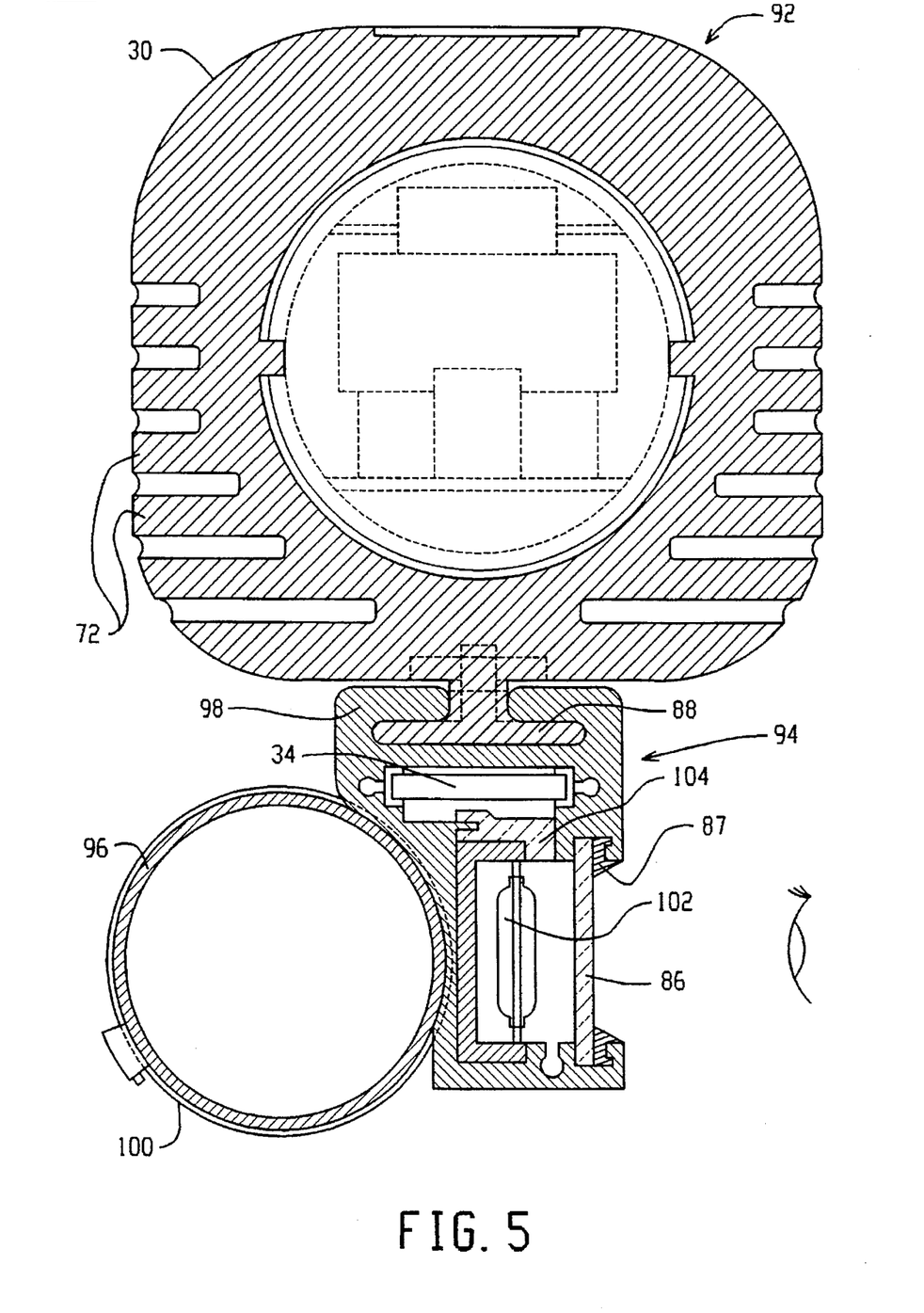
FIG. 5 shows a top view of a second embodiment of an illuminated fluid level indicator constructed according to the principles of the present invention.
Figure 6:
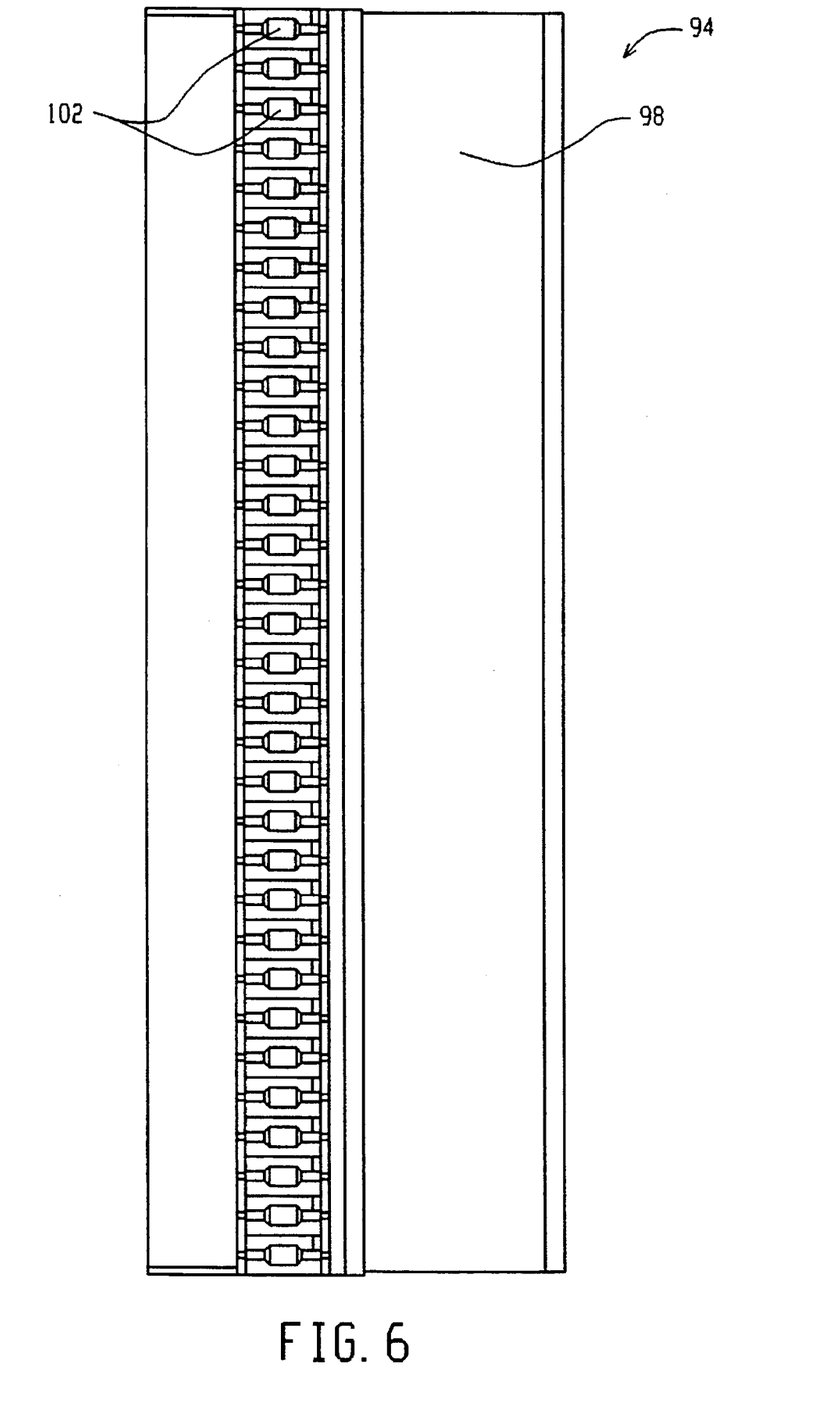
FIG. 6 shows a front view of the of the illuminator/magnetic indicator assembly of the illuminated fluid level indicator of FIG. 5.

A second embodiment of the invention is shown in FIGS. 5–6 as illuminated indicator 92. Unlike the first embodiment of the invention described above which provides a backlighting assembly 14 for a visual fluid indicator 12, this second embodiment of the invention provides a side-lighting mechanism for a magnetic fluid indicator. This second embodiment utilizes the same enclosure 30, including the transformer assembly 40 and the illumination source 31 described above, as well as the same illumination panel 34 and light cable 74.

This second embodiment of the invention comprises an illuminator/magnetic indicator assembly 94 adapted to be used with a vertically extending vessel such as a pipe 96 containing a floating magnet (not shown). The assembly 94 includes a illumination panel housing 98 which (like the first embodiment) contains the illumination panel 34. Also like the first embodiment, the enclosure 30 is slidably engageable with the illumination panel housing 98 by means of the T-bar extension 88 which extends from the enclosure. A hose clamp 100 is used to attach the illumination panel housing 98, and thus the illuminator/magnetic indicator assembly 94, to the pipe 96. Other attachment devices, such as the spring clips 36 described above with respect to the first embodiment, may also be used.

The assembly 94 also includes an array of magnetic indicating elements 102. The magnetic indicating elements 102 respond to movement of the magnet in the pipe, in a manner known in the art, to provide a visual indication of the level of fluid in the pipe. The indicating elements 102 may be coated with a phosphorescent or other type of highly visible paint or coating to enhance visibility.

A front view of the illuminator/magnetic indicator assembly 94 is shown in FIG. 6. As used herein with respect to the second embodiment of the invention, "front" shall mean the surface of the array of magnetic indicating elements 100 which is viewed when looking right to left in FIG. 5 or when viewing FIG. 6 directly. The array of magnetic indicating elements 102, and the illumination panel 34 positioned alongside, are protected from the outside environment, as in the first embodiment, by protective transparent plate 86 and gasket 87. In addition, an internal transparent (acrylic) plate 104 is provided for directing light from the illumination panel 34 to the magnetic indicating elements 102.

As shown in FIG. 5, the illumination panel 34 is positioned generally perpendicular to the array of magnetic indicating elements 102. It is contemplated, however, that the panel and the array may be positioned in other orientations with respect to each other, as long as the position of the panel is such as to shine sufficient light onto the array of indicating elements.

Accordingly, the preferred embodiments of an illuminator for a fluid level indicator have been described. With the foregoing description in mind, however, it is understood that this description is made only by way of example, and that the invention is not limited to the particular embodiments described herein. For example, it is contemplated that the invention may be used on sight flow indicators, sight gauges, or sight glasses as well as on the disclosed liquid level devices. Moreover, various rearrangements, modifications, and substitutions may be implemented without departing from the true scope of the invention as defined by the following claims and their equivalents.

We claim:

1. A lighting assembly for directly illuminating a magnetic indicator which indicates a level of a fluid in a container to which said magnetic indicator is attached, said lighting assembly comprising:

a substantially flat illumination panel located proximate at least one indicator element on the magnetic indicator and comprising a plurality of fiber optic fibers;

an attachment mechanism connected to said illumination panel for attaching said substantially flat illumination panel to the fluid container proximate said indicator element; and an illumination source optically coupled to said substantially flat illumination panel.

2. The lighting assembly of claim 1, wherein said at least one indicator element is comprised of an array of indicator elements.

3. The lighting assembly of claim 2, wherein said substantially flat illumination panel lies in a first plane which is substantially perpendicular to a second plane in which the array of magnetic indicator elements lie.

4. The lighting assembly of claim 1, wherein said illumination source is a gas filled light source operating at less than 25 volts A.C.

5. The lighting assembly of claim 1, wherein said illumination source is enclosed in an enclosure designed to meet NEMA 7 explosion-proof standards and NEMA 4 waterproof standards.

6. The lighting assembly of claim 1, wherein said illumination source is optically coupled to said fiber optic panel by a fiber optic light cable, said illumination source pointing generally downwardly toward said fiber optic light cable.

7. The lighting assembly of claim 1, wherein said fiber optic panel is at least partially confined within a housing, and wherein said attachment mechanism comprises a plurality of resiliently deflectable spring clips extending from said housing, said spring clips being designed to (i) resiliently deflect during coupling of said housing to the fluid container, (ii) engage an outer surface of said container with a predetermined amount of resistance when said housing is attached to the container, and (iii) resiliently deflect during uncoupling of the housing from the container.

8. The lighting assembly of claim 1, wherein said fiber optic panel is at least partially confined within a housing, and wherein said attachment mechanism comprises a hose clamp for attaching said housing to said container.

9. The lighting assembly of claim 1, wherein said fiber optic panel is at least partially confined within a housing, wherein said illumination source is enclosed in an enclosure, and wherein said enclosure is slidably engageable with said housing.

10. A combination magnetic indicator and lighting assembly attachable to a fluid container having a magnetic float contained therein, comprising:

a magnetic indicator including at least one magnetic indicator element which moves in response to movement of the magnetic float contained within the container to indicate the level of fluid in the container;

a lighting assembly for directly illuminating said magnetic indicator element comprising (i) a substantially flat illumination panel located proximate said indicator element on the magnetic indicator and comprising a plurality of fiber optic fibers; and (ii) an illumination source optically coupled to said substantially flat illumination panel; and an attachment mechanism connected to said illumination panel for attaching said combination magnetic indicator and lighting assembly to the container.

11. The combination magnetic indicator and lighting assembly of claim 10, wherein said at least one indicator element is comprised of an array of indicator elements.

12. The combination magnetic indicator and lighting assembly of claim 11, wherein said substantially flat illumination panel lies in a first plane which is substantially perpendicular to a second plane in which said array of magnetic indicator elements lie.

13. The combination magnetic indicator and lighting assembly of claim 10, wherein said illumination source is a gas filled light source operating at less than 25 volts A.C.

14. The combination magnetic indicator and lighting assembly of claim 10, wherein said illumination source is enclosed in an enclosure designed to meet NEMA 7 explosion-proof standards and NEMA 4 waterproof standards.

15. The combination magnetic indicator and lighting assembly of claim 10, wherein said illumination source is optically coupled to said fiber optic panel by a fiber optic light cable, said illumination source pointing generally downwardly toward said fiber optic light cable.

16. The combination magnetic indicator and lighting assembly of claim 10, wherein said assembly is removably attachable to the container.

17. The combination magnetic indicator and lighting assembly of claim 16, wherein said fiber optic panel is at least partially confined within a housing, and wherein said attachment mechanism comprises a plurality of resiliently deflectable spring clips extending from said housing, said spring clips being designed to (i) resiliently deflect during coupling of said assembly to the fluid container, (ii) engage an outer surface of said container with a predetermined amount of resistance when said assembly is attached to the container, and (iii) resiliently deflect during uncoupling of the assembly from the container.

18. The lighting assembly of claim 16, wherein said fiber optic panel is at least partially confined within a housing, and wherein said attachment mechanism comprises a hose clamp for attaching said housing to said container.

19. The combination magnetic indicator and lighting assembly of claim 16, wherein said fiber optic panel is at least partially confined within a housing, wherein said illumination source is contained by an enclosure, and wherein said enclosure is slidably engageable with said housing.

20. The combination magnetic indicator and lighting assembly of claim 16, wherein said fiber optic panel and said magnetic indicator are at least partially confined within a housing which is provided with a protective transparent plate covering said magnetic indicator.

* * * * *

UNITED STATES PATENT AND TRADEMARK OFFICE
CERTIFICATE OF CORRECTION

PATENT NO. : 5,645,336
DATED : July 8, 1997
INVENTOR(S) : Brown, et al.

It is certified that error appears in the above-indentified patent and that said Letters Patent is hereby corrected as shown below:

On the title page, in item: [62], delete "abandoned".
Column 1, line 4, delete "abandoned".

Signed and Sealed this

Seventh Day of October, 1997

*Attest:*

BRUCE LEHMAN

*Attesting Officer*     *Commissioner of Patents and Trademarks*